United States Patent

[11] 3,613,030

[72] Inventor Tore Torstensson Fjallbrant
Goteborg, Sweden
[21] Appl. No. 13,600
[22] Filed Feb. 24, 1970
[45] Patented Oct. 12, 1971
[73] Assignee Telefonaktiebolaget LM Ericsson
Stockholm, Sweden
[32] Priority Mar. 12, 1969
[33] Sweden
[31] 3402/69

[54] FILTER WITH A PERIODIC TRANSFER CHARACTERISTIC
3 Claims, 4 Drawing Figs.

[52] U.S. Cl. .......... 333/70 A, 328/167, 333/70 T
[51] Int. Cl. .......... H03h 7/04
[50] Field of Search .......... 328/151, 167; 333/29, 70, 70 A, 70 T

[56] References Cited
UNITED STATES PATENTS 3,370,292 2/1968 Deerfield .......... 328/167 X

*Primary Examiner*—Herman Karl Saalbach
*Assistant Examiner*—Paul L. Gensler
*Attorney*—Hane and Baxley

ABSTRACT: A filter with a periodic frequency characteristic for filtering sampled signals comprises two addition circuits and $p$ delay circuits serially between the two addition circuits. Each addition circuit is so constructed that at the outlet side there is obtained the sum of the input signals multiplied by factors associated with the input terminals of the circuit. The delay of each of the delay circuits is equal to the sampling period T of the sampled signals. The outlets of the delay circuits are connectable, via contacts, to the inlet of the addition circuit at the inlet side of the filter. These contacts are closed during a number of K sampling periods and then open during $p$ sampling periods.

PATENTED OCT 12 1971 3,613,030

INVENTOR
TORE TORSTENSSON FJÄLLBRANT

BY Hane and Baxley
ATTORNEYS

FILTER WITH A PERIODIC TRANSFER CHARACTERISTIC

The present invention relates to a filter with a periodic frequency characteristic intended for filtering of signals sampled with the period T and consisting of a first and a second addition circuit. Each circuit has one outlet and a number of inlets and is so arranged that at the respective outlet there is obtained the sum of the input signals multiplied by a factor associated with each inlet. One inlet of the first addition circuit constitutes the inlet of the filter and the outlet of the second addition circuit constitutes its outlet. The outlet of the first addition circuit is connected both to an inlet of the second addition circuit and to the inlet of the first of a number of delay circuits, the delay of which is equal to the sampling period T and the outlets of which are connected each to their inlet in the second addition circuit.

In the case of so-called combfilters, i.e. filters with a periodic transfer characteristic in the frequency plane, the filter effect is obtained when the signal to be filtered is sampled periodically and certain fractions of earlier sample values are added to the resulting sampled value. This is achieved with the aid of suitably interconnected addition units and delay circuits, as described for example in the article "Recent Advances in the Synthesis of combfilters" 1957 I.R.E. Nat. Conv. Rec. pp 186–199. In the filters shown in the article a transfer function is obtained having a degree which is equal to the number of delay circuits in the filters. This means that, when high degrees are required, the filters are relatively expensive. But it is possible, for example, with only one delay circuit to realize a filter with an arbitrarily high degree of the transfer function, the number of output signals, however, diminishing in proportion to the increased degree, and, as the sampling frequency at the outlet is so low. The filters can only be used when the signals can be reproduced frequency-transformed at the outlet also within the interval 0 to half the sampling frequency at the inlet If, for example, one wishes to achieve a filter with the degree N, an output signal is obtained only at each $N+1th$ input signal. An object of the present invention is therefore to achieve a filter of the above-described type having a degree which is greater than the number of delay circuits, and with which an output signal is obtained more often than with the last-described filter.

Figure 1:
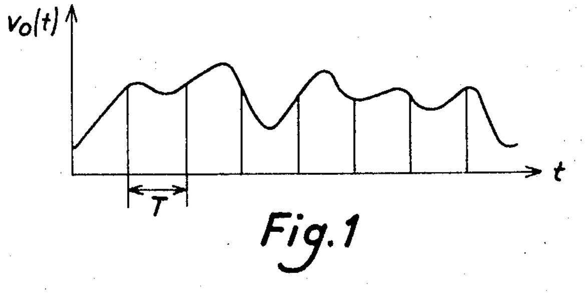
Figure 2:
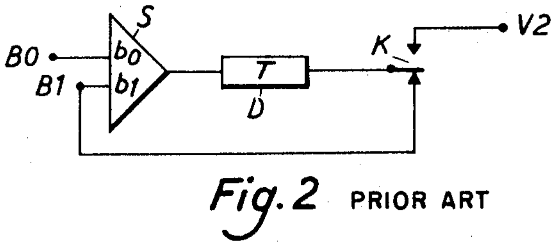
Fig. 2 PRIOR ART
Figure 3:
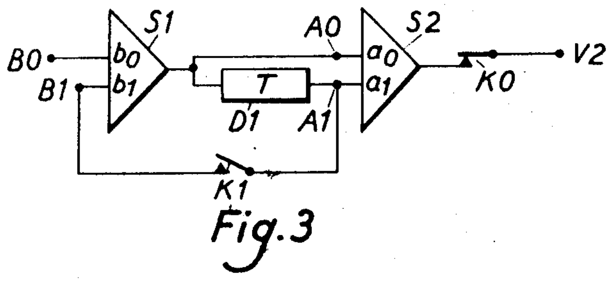
Figure 4:
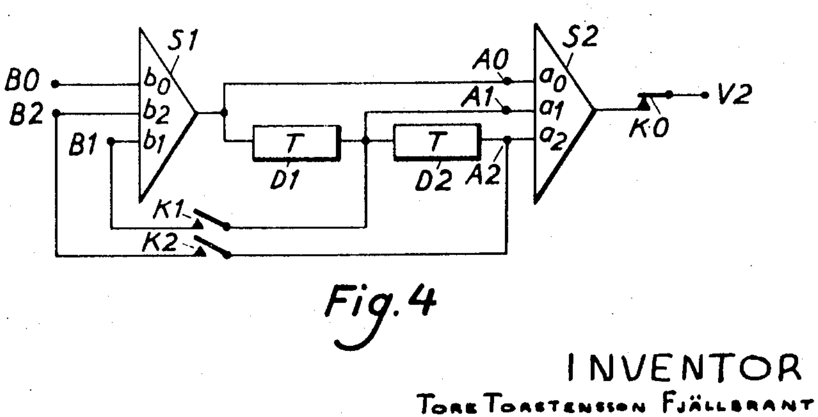

The invention will be explained in greater detail with reference to the accompanying drawing, in which FIG. 1 shows a signal $v_0(t)$ sampled with the period T, FIG. 2 shows a known filter, FIG. 3 and FIG. 4 show examples of filters according to the invention.

FIG. 1 shows a signal $v_0(t)$ which is sampled periodically with the period T. FIG. 2 shows the initially mentioned known filter which consists of an addition circuit S with two inlets B0 and B1; at the outlet of the addition circuit there are obtained the input signals multiplied by the factors $b_0$ and $b_1$ respectively. This outlet is connected to the inlet of a delay circuit D, the delay of which is equal to the time T. The outlet of the delay circuit is connectable via a changeover contact K both to the outlet V2 of the filter and to the inlet B1 of the addition circuit. The other inlet B0 of the addition circuit constitutes the inlet of the filter to which a signal sampled as in FIG. 1 is fed. With this filter a transfer function of arbitrarily high degree can be realized in the following manner. If the desired degree is 4, the contact K is connected first to the inlet B1 during 4 sampling periods and thereafter to the outlet of filter during the fifth sampling period, the multiplication factor $b_0$ being caused to assume different values during the five periods. If these values are $b_{00}$, , $b_{01}$ ... $b_{04}$ and the factor $b_1=1$, the following output signal is obtained at the fifth sampling period:

$$v_2(t)=b_{04}v_0(t)+b_{03}v_0(-T)+b_{02}v_0(t-2T)+b_{01}v_0(t-3T)+b_{00}v_0(t-4T)$$

If this equation is Laplace transformed and the resulting frequency variable $e^{jwt}$, where $w$ is the frequency and $j$ the complex operator is made equal to Z, the following expression is obtained taking into account that the time displacement T corresponds to a multiplication by the factor $1/Z$ (see, for example, the aforementioned article):

$$V_2(Z)=b_{04}V_0(Z)+b_{03}V_0(Z)\frac{1}{Z}+\cdots+b_{00}V_0(Z)\frac{1}{Z^4}$$

which gives the transfer function:

$$\frac{V_2(Z)}{V_0(Z)}=\frac{b_{04}V_0(Z)Z^4+b_{03}V_0(Z)Z^3+\cdots+b_{00}V_0(Z)}{Z^4}$$

i.e. the degree is equal to the number of sampling periods during which the contact $K$ is connected to the inlet B1. The disadvantage is, however, that the output signal is obtained only during the sampling period when the contact is connected to the outlet $V2$, i.e. at every fifth period according to the example. This circuit also assumes that the factor $b_0$ can be changed periodically if the coefficients in the numerator of the transfer function are to assume arbitrary values.

FIG. 3 shows an embodiment of a filter according to the invention. This filter comprises two addition circuits S1 and S2, which are made up in the same way as the addition circuit S in FIG. 2. The respective multiplication factors are $b_0$, $b_1$ and $a_0$, $a_1$, with the factor $b_0$ assumed to be 1. The outlet of the circuit S1 is connected both to an inlet AO of the second addition circuit S2 and to the inlet of a delay circuit D1, the delay of which is equal to the sampling period T. The outlet of the delay circuit is connected both to the second inlet A1 of the circuit S2 via a contact K1, to an inlet B1 of the circuit S1 whose second inlet B0 constitutes the inlet of the filter. Furthermore the outlet of the circuit S2 is connected to the outlet V2 of the filter via a contact K0. With this filter a transfer function with the degree 2 can be obtained by making and breaking contact K1 during alternate sampling periods, the transfer function being obtained when contact K1 is open. This can be perceived by studying the process for three consecutive signal pockets fed to the inlet B0. If it is assumed that contact K1 is closed when the second of these packets arrives at the filter, i.e. at the time when the first packet is obtained at the outlet of circuit D1, there is obtained at the third signal packet an output signal from the filter composed of the following signal values: the third signal pockets multiplied by the factor $a_0$, the second signal packet which is fed via circuit D1 to the inlet A1 and is thus multiplied by the factor $a_1$, and the first signal packet which has first been fed back via circuit D1 and contact K1 to circuit S1 and thereafter fed via circuit D1 to the inlet A1, being thus multiplied by the factor $b_1a_1$. The output signal obtained at every second input signal is thus:

$$v_2(t)=v_0(t)a_0+v_0(t-T)a_1+v_0(t-2T)a_1b_1$$

which, after a Laplace transformation in the same way as in Fig. 1, gives the transfer function:

$$\frac{V_2(Z)}{V_0(Z)}=a_0+\frac{a_1}{Z}+\frac{a_1b_1}{Z^2}=\frac{a_0Z^2+a_1Z+a_1b_1}{Z^2}$$

i.e. the degree 2 is obtained without change of any multiplication factor, and furthermore an output signal is obtained for every second input signal instead of only every third as in the filter in FIG. 2. It is also conceivable, of course, either to close contact K0 when this transfer function is obtained or to provide the changeover contact with a further outlet in order to obtain at the outlet during the second sampling interval the transfer function:

$$\frac{V_2(Z)}{V_0(Z)}=a_0+\frac{a_1}{Z}$$

With this filter, transfer functions of higher degree can also be obtained, in which case, however, the factor $b_1$ must be varied periodically in order that arbitrary polynomials may be obtained in the numerator of the transfer function. For, if contact K1 is kept closed during $n-1$ sampling periods and thereafter, during the next period, this contact is opened and contact K0 closed, and if the factor $b_0$ is allowed to assume the values $b_{01}$, $b_{02}$ .... $b_0(n-l)$ during the respective sampling periods when contact K1 is closed, the following transfer function will be obtained:

$$\frac{V_2(Z)}{V_0(Z)}=a_0+a_1\frac{1}{Z}+a_1b_{01}\frac{1}{Z^2}+a_1b_{01}b_{02}\frac{1}{Z^3}+\cdots+a_1b_{01}b_{02}\cdots b_{0(n-1)}\frac{1}{Z^n}$$

$$=\frac{a_0Z^n+a_1Z^{n-1}+a_1b_{01}Z^{n-2}+\cdots+a_1b_{01}b_{02}\cdots b_{0(n-1)}}{Z^n}$$

As appears from this expression the coefficient $b_0$ must be variable if the coefficients in the numerator polynomial are to assume the desired values.

FIG. 4 shows a further example of a filter according to the invention in which the same reference characters have been used for components identical to those in FIG. 3. As will be seen, FIG. 4 differs from FIG. 3 in that the outlet of delay circuit D1 is connected to an additional, identical circuit D2, the outlet of which is connected both to inlet A2 of circuit S2 and, via a contact K2, to an inlet B2 of the circuit S1. With this filter, without varying the factors $b_1$, $b_2$ and $a_0$, $a_1$, $a_2$ at every third sampling period, it is possible to realize a transfer function with degree 4 by keeping the contacts K1 and K2 closed during the sampling period preceding that during which the transfer function is obtained. This is apparent is one studies the process for five consecutive input signals to the filter. If it is assumed in this case that contacts K1 and K2 are closed only when the third of these input signals is fed to the inlet of the filter, i.e. when the first input signal has reached the outlet of the circuit D2 and the second input signal has reached the output of circuit 01, the two latter signals will be fed back to inlets B1 and B2 respectively of circuit S1. When the two following input signals, i.e. the fourth and the fifth, are fed to the filter inlet, contacts K1 and K2 are then open, while contact K0 is closed with the fifth input signal is fed to the filter inlet. At the outlet of the filter a signal composed of the following signal valves is then obtained assuming $b_0=1$: the fifth signal multiplied by the factor $a_0$, the fourth signal multiplied by the factor $a_1$, the third signal multiplied by the factor $a_2$, the second signal multiplied by the factor $a_2b_2$, and the first signal multipled by the factor $a_2b_1$. The output signal $v_2(t)$ is thus:

$$v_2(t)=v_0(t)a_0+v_0(t-T)a_1+v_0(t-2T)a_2+v_0(t-3T)a_2b_2+v_0(t-4T)a_2b_1$$

i.e., with the same calculations as before, the following transfer function is obtained:

$$\frac{V_2(Z)}{V_0(Z)}=a_0+\frac{a_1}{Z}+\frac{a_2}{Z^2}+\frac{a_2b_2}{Z^3}+\frac{a_2b_1}{Z^4}=\frac{a_0Z^4+a_1Z^3+a_2Z^2+a_2b_2Z+a_2b_1}{Z^4}$$

At the time when this transfer function is obtained, accordingly, the fifth signal is on its way into circuit D1 and the fourth signal on its way into circuit D2, i.e. these signals constitute also the first two signals in the next sequence comprising five signals, which means that the above-mentioned transfer function is obtained at every third sampling period. Obviously, as in FIG. 3, it is possible to provide the changeover contact with additional outlets and in intermediate sampling periods obtain transfer functions with lower degree. It is also apparent that transfer functions of higher degree than four can be obtained with this filter by keeping contacts K1 and K2 closed during several consecutive sampling periods and during these periods changing the coefficients $b_1$ and $b_2$, in analogy with the procedure for the filter of FIG. 3, thereafter opening the contacts during two sampling periods, the transfer function with the higher degree being obtained during the last of these sampling periods. A raising of the degree thus means that an output signal is obtained less often.

It should also be emphasized that the above filters are merely examples of the invention. It is, of course, possible to connect an arbitrary number of delay circuits, in which case, without varying the factors $b_1$, $b_2$ etc., a transfer function can be obtained with a degree twice as high as the number of delay circuits, but not with the same freedom of choice of the transfer function, the number of input signals required being equal to the number of delay circuits plus 1. In this general case, as well, it is naturally possible to raise the degree still further by keeping the contacts which reconnect the input signal to the first addition circuit closed during several sampling periods, during which the coefficients $b_1$, $b_2$ etc. are changed.

I claim:

1. A filter with a periodic frequency characteristic for filtering signals sampled during sequential periods of time T comprising first and second signal addition circuits each having a plurality of inlets and an outlet, each of said addition circuits including means for multiplying signals received at their respective inlets by given values and transmitting from their respective outlets a signal representing the sum of the multiplied signals, one inlet of said first addition circuit being the inlet of the filter, the outlet of said second addition circuit being the outlet of the filter, at least one signal delay means for delaying signals for a period of time T equal to a sampling period connected between the outlet of said first addition circuit and an inlet of said second addition circuit, means for directly connecting the outlet of said first addition circuit to another inlet of said second addition circuit, and at least one switching feedback means connecting the outlet side of said signal delay means to another inlet of said first addition circuit, said switching feedback means being operable to pass signals for at least one sampling period and to block signals for a number of sampling periods equal to the number of delay means.

2. The filter of claim 1 comprising $p$ serially connected signal delay means, each of said signal delay means delaying a signal for a period of time T, means for connecting the inlet of the signal delay means at one end of the series of signal delay means to the outlet of said first signal addition circuit, means for connecting the outlet of each signal delay means to a different inlet of said second signal addition circuit and a plurality of switching feedback means, each of said switching feedback means connecting the outlet of one of said signal delay means to a different inlet of said first signal addition circuit, respectively, each of said switching feedback means being operable to pass a signal during K sampling periods and thereafter to block a signal for p sampling periods whereby during the last of these sampling periods a transfer function having a degree equal to $2p+(K-1)$ is obtained.

3. The filter of claim 2 wherein the given multiplication values change during the sampling periods when the switching feedback means pass signals.